United States Patent [19]
Moore

[11] Patent Number: 6,161,402
[45] Date of Patent: Dec. 19, 2000

[54] LOCKING APPARATUS FOR FIFTH WHEEL KING PIN

[76] Inventor: Donald F. Moore, 4825 Sturbridge St., Memphis, Tenn. 38141

[21] Appl. No.: 09/064,418

[22] Filed: Apr. 22, 1998

[51] Int. Cl.[7] .................................................. E05B 73/00
[52] U.S. Cl. .................................................. 70/14; 70/232
[58] Field of Search .................................. 70/14, 18, 58, 70/232

[56] References Cited

U.S. PATENT DOCUMENTS

| | | | |
|---|---|---|---|
| 2,641,124 | 6/1953 | Gallagher, et al. | 70/232 |
| 2,883,850 | 4/1959 | Falck | 70/232 X |
| 3,415,085 | 12/1968 | Ebel, Jr. | 70/232 |
| 3,798,938 | 3/1974 | McCullum | 70/232 X |
| 3,832,872 | 9/1974 | Gerlach | 70/232 |
| 4,031,727 | 6/1977 | DeGroat et al. | 70/232 |
| 4,094,173 | 6/1978 | Brown | 70/232 X |
| 4,141,233 | 2/1979 | Reyes | 70/232 |
| 4,620,718 | 11/1986 | Mickelson | 280/507 |
| 4,648,254 | 3/1987 | Bloemers | 70/232 |
| 4,841,756 | 6/1989 | Curtis | 70/232 |
| 5,052,203 | 10/1991 | Van Cuyk | 70/232 |
| 5,136,863 | 8/1992 | Richardson | 70/14 |
| 5,214,945 | 6/1993 | Martin | 70/232 |
| 5,259,223 | 11/1993 | Nee | 70/232 |
| 5,297,407 | 3/1994 | Tarr | 70/232 |
| 5,410,893 | 5/1995 | Easterwood | 70/14 |

FOREIGN PATENT DOCUMENTS 2229688  10/1990  United Kingdom ........ 70/14

Primary Examiner—Suzanne Dino Barrett
Attorney, Agent, or Firm—Garvey, Smith, Nehrbass & Doody, LLC

[57] ABSTRACT

A locking apparatus for locking a fifth wheel king pin includes a cylindrically shaped lock body that fits over the king pin and covers it. A lateral passageway through the locking body receives a locking member that includes a pair of shanks that fit the king pin at annular shoulder portions. The lateral passageway has open end portions that communicate with the outer wall of the lock housing or lock body. End portions of the locking member occupy the channel at the openings to prevent a thief from gaining access to either end portion of the locking member with a hammer, saw or torch.

20 Claims, 3 Drawing Sheets

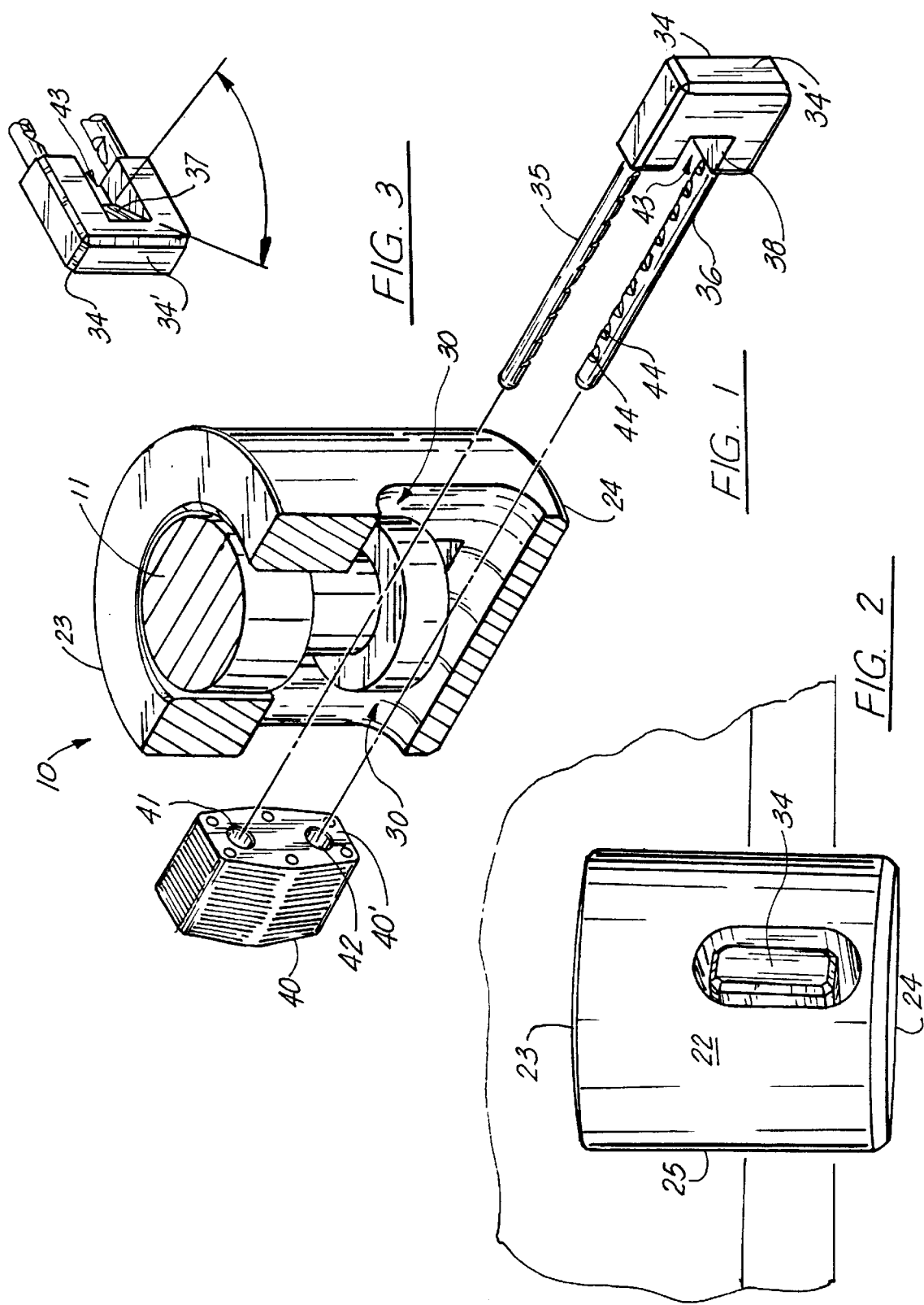

LOCKING APPARATUS FOR FIFTH WHEEL KING PIN

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

The present invention relates to tractor trailer king pins and more particularly, to an improved locking arrangement for locking the king pin of a trailer. More particularly, the present invention relates to a locking apparatus for locking a fifth wheel king pin wherein a body envelops a king pin and a locking member to protect it, the body having a laterally extending passageway that is fully occupied by a locking member that engages annular shoulder portions of the king pin.

2. General Background of the Invention

King pins are provided on large trailers that are used to transport goods cross country on local, national and interstate highways. One of the most serious problems facing the owners and operators of such tractor trailer rigs is theft of the trailer and all of its contents. These trailers may often be filled with hundreds of thousands of dollars worth of goods that are subject to theft when left unattended, whether in a yard or enroute during a driver break.

In order to combat the problem of theft of large trailers, king pin locking devices and security devices have been developed and many patented in an attempt to combat thievery.

An early patent issued to Gallagher is entitled "Lock for Fifth Wheel King Pins". The Gallagher U.S. Pat. No. 2,641,124 affixes to a king pin that is generally cylindrical in form and which has an annular groove adapted to receive the usual fifth wheel of a tractor or other type of propelling means for the trailer. The Gallagher device includes a shroud that covers the king pin in the form of a sleeve that has a front casing welded thereto and extending tangentially therefrom. This arrangement is objectionable because it has exposed lock parts that could give a thief access to the lock by providing the projecting portion of the lock that could be hammered or smashed or cut with a powered saw or torch.

The Eble U.S. Pat. No. 3,415,085 provides a lock for a truck trailer. The device purportedly prevents the theft of tractor trailers, the device having a shroud for covering the grooved king pin of such trailers and a locking member for detachably securing the shroud around the king pin. As with the Gallagher patent, the Eble device provides projecting parts that could be hammered or cut.

Another such locking device for king pins is seen in the Gerlach U.S. Pat. No. 3,832,872, entitled "Trailer Coupling Pin Lock Collar". The Gerlach patent disclosed a cylindrical collar that is received upwardly telescoped over a downwardly projecting trailer coupling pin and a U-shaped keeper which is slidably received through the collar movable between pin engaging and disengaging positions. In the keeper pin engaging position, leg portions thereof span opposite portions of the collar opening passing through opposite portions of the usual annular recess of the coupling pin thereby retaining the collar over the coupling pin preventing the coupling pin from engaging a trailer pulling tractor. A lock through a pivotal cam bar slides a locking bar transversely into engagement with the keeper when the keeper is in its pin engaging position thereby locking the keeper in such pin engaging position. In the Gerlach device, exposed parts extend beyond the locking device so that they could be hammered or cut in order to gain access to the king pin.

The Mickelson U.S. Pat. No. 4,620,718, provides a king pin lock that relates to equipment for securing a truck trailer. The device employs a lock housing or body which has a hole which is adapted to fit over the trailer king pin. The device employs a lock housing or body which has a hole which is adapted to fit over the trailer king pin. A sliding member is employed to go into sliding contact with the groove in a standard trailer king pin. The sliding member is configured with a concave edge on one end in order to contact the annular groove in the standard trailer king pin. A slot in the sliding member is used to engage the body of a heavy duty padlock when in the locked position thus holding the sliding member in contact with the trailer king pin. A retaining means such as a screw threadably secured to the lock body and a mating slot in said sliding member is employed to prevent the inadvertent removal of said sliding member from the lock body. Exposed parts are present on the Mickelson device that could be hammered or cut in order to tear the device apart.

The Van Cuyk U.S. Pat. No. 5,052,203, provides a lock apparatus for use with a fifth wheel plate having a king pin characterized by an annular groove including a generally cylindrical cup adapted to enclose the king pin, the cup having a transversely extending slot which is registerable with the annular groove, bar means connected to the cup for selective registry with the slot and engagement with the groove, and locking means for locking the bar means into engagement with the groove.

The Richardson U.S. Pat. No. 5,136,863, discloses an anti-theft trailer pin lock. The Richardson device includes an inner member and an outer member to enclose a trailer king pin. The inner member has an outer shell with a laterally extending slot for receiving the king pin. Plates are mounted transversely of the shell adjacent to the slot edges for preventing axial movement of the inner member relative to the king pin. Padlock shackles are fixedly mounted to and extend radially from the inner member. A padlock body has a key cylinder for locking the padlock body onto the shackles. An outer sleeve member has an open end for receiving the inner member and shaft end, and a side opening positioned and sized to receive the padlock body during locking of the padlock body onto the shackles. The padlock body extends through the side opening when the padlock body is locked onto the shackles, whereby the inner member is fixed axially relative to the outer member and the shaft end is captured in the device.

A king pin security device is provided in U.S. Pat. No. 5,259,223. The apparatus includes a semi-circular plate transverse to a flat base. The pate has a channel therein, also preferably being semi-circular in cross-section. The channel in the plate defines a shoulder there above. The dimensions of the channel and the shoulder are such as to form a close fit with the annular recess and annular lip found on a standard king pin. Opposite the vertically extending plate, the base transitions to a longitudinally extending arm. At the distal end of the arm is a shield plate, disposed generally transverse and spaced apart from the base. After the king pin security device is affixed to a king pin, a standard padlock can be attached to this extending arm. The shackle of the padlock prevents disengagement of the king pin from the king pin security device. The shield plate prevents the padlock from slipping off the arm, as well as shielding it from vandals or intruders. The king pin security device also includes a downwardly extending vertical flange. This flange also serves to protect the body and shackles of the padlock.

U.S. Pat. No. 5,297,407 provides a collar member arranged to receive a trailer pin to effect surrounding of the trailer pin in order to prevent access to the trailer pin for unauthorized removal of the associated trailer structure. To this end, the collar includes a channel having a floor, and the channel further including a U-shaped rib arranged to guide a locking head onto the rib to secure the locking head within the channel and effect surrounding of the collar preventing access thereto.

These above prior art devices all suffer common inadequacies because they have exposed parts that extend beyond the main structural body of the lock. Such exposed parts can be hammered, cut, pried or burned in order to defeat the lock.

The present invention is an improvement to these prior art devices by providing a locked member that does not expose any parts beyond the outer surface of the lock body. The lock body is further formed of a specially toughened, treated material which is resistant to normal steel cutting instruments such as powered saws and welding/cutting torches. This provides a very rugged, structurally sound locking mechanism that is not easily dismantled by a thief.

BRIEF SUMMARY OF THE INVENTION

The present invention thus provides an improved locking apparatus for locking a fifth wheel king pin. The apparatus can be used with a trailer having an underside surface with a king pin extending down from the underside surface, the king pin being generally cylindrically shaped at its outer surface with a larger diameter section and providing an annular recess that extends circumferentially about the king pin, a smaller diameter area of the king pin being provided at the annular recess.

A generally cylindrically shaped locking housing envelopes the king pin completely during use. The housing has a top surface, a bottom surface and a side wall. A central, generally vertical socket receives the king pin during use.

A lateral passageway extends through the housing, the lateral passageway being open-ended to communicate with the housing side wall at two spaced apart openings in the side wall.

The lateral passageway communicates with the annular recess of the king pin when the housing is assembled upon the king pin. A removable locking member occupies the lateral passageway, the locking member having first and second end portions that are positioned respectively at the spaced apart side wall openings.

A central portion of the locking member occupies a portion of the annular recess so that when a locking member is in position within the lateral passageway, the king pin and locking housing cannot be separated. One end of the locking member can be keyed, or provided with tumblers that must be opened to disconnect the locking member from the lateral passageway.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a perspective, exploded, partially cut-away view of the preferred embodiment of the apparatus of the present invention;

FIG. 2 is a perspective elevational view of the preferred embodiment of the apparatus of the present invention;

FIG. 3 is a perspective, fragmentary view of the locking member portion of the preferred embodiment of the apparatus of the present invention;

DETAILED DESCRIPTION OF THE INVENTION

Figure 4:
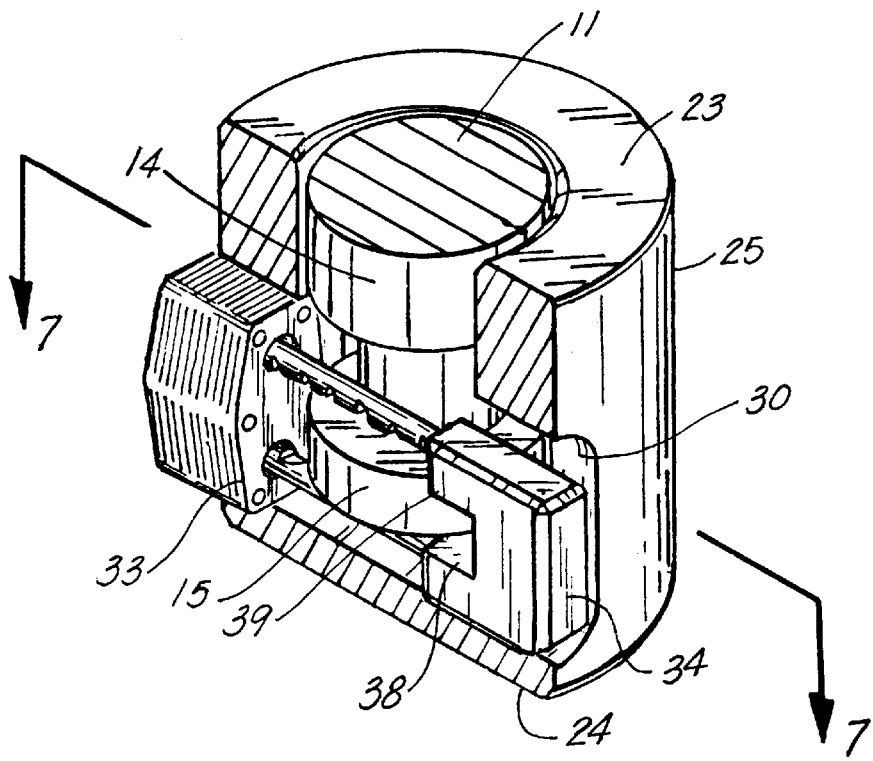
FIG. 4 is a perspective cut-away view of the preferred embodiment of the apparatus of the present invention showing the locking member in the locking position on the king pin.
Figure 5:
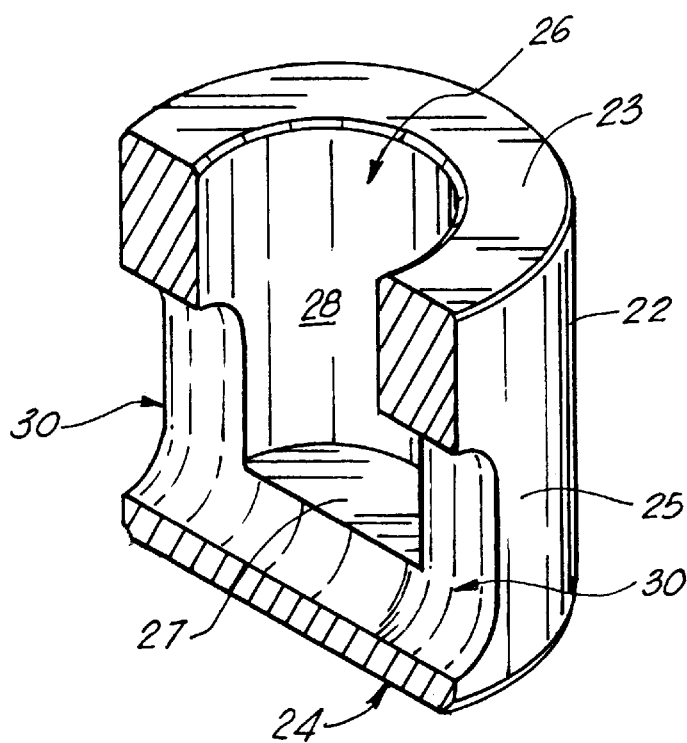
FIG. 5 is a partial perspective cut-away view of the preferred embodiment of the apparatus of the present invention illustrating the locking housing portion thereof.
Figure 6:
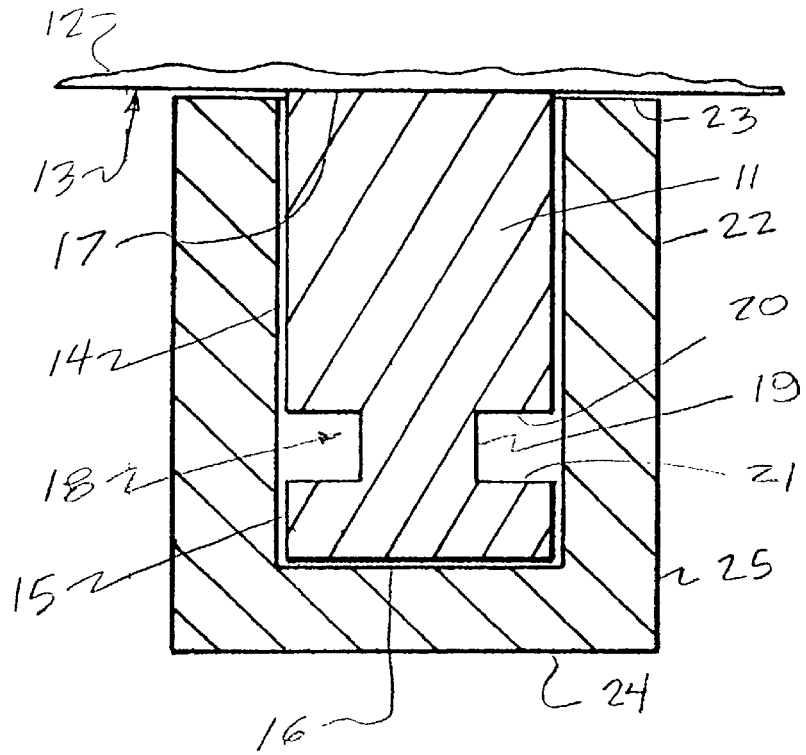
FIG. 6 is a sectional, elevational view of the preferred embodiment of the apparatus of the present invention showing the housing and operative position upon the king post and with the locking member removed.

FIGS. 1–5 show generally the preferred embodiment of the apparatus of the present invention designated generally by the numeral 10 in FIGS. 1 and 4. King post locking apparatus 10 is used to prevent theft of a trailer by locking the king post or king pin 11 of a trailer 12. The king post or king pin 11 depends downwardly from the trailer under surface 13 as is known in the art. The king post typically provides two larger diameter cylindrical sections 14 and 15 of generally uniform diameter separated by an annular recess 18 that defines a smaller diameter cylindrical section 19. The king post 11 has an upper surface 17 that is attached by welding for example, to the trailer under surface 13, and a circular bottom surface 16. In FIG. 6, king post 11 provides a pair of annular shoulders 20, 21, next to the smaller diameter section 19, as shown.

A locking housing 22 can be in the form of a generally cylindrically shaped member that is an integral, structurally sound member of cast iron, welded steel or the like. Preferably however, housing 22 is fabricated of such as 302 stainless steel. As should be appreciated by those skilled in the art, were a higher degree of strength and toughness desirable for resistance against compromise, more resistant materials as titanium and other metals and alloys might be used.

The housing 22 can additionally be made very large and thick so that it can not be easily cut or hammered away by a thief. The housing 22 provides an upper surface 23, a lower surface 24, and a cylindrically shaped side wall 25. Housing 22 provides a cylindrically shaped socket 26 with a circular end wall 27. The circular end wall 27 registers against bottom surface 16 of king post 11 as shown in FIG. 6 when the housing 22 is in its operative locking position on the king post 11. Similarly, the upper surface 23 of housing 22 registers flush with trailer under surface 13, as shown in FIG. 6. This provides maximum coverage of the king post 11 and disallows any opportunity for a thief to gain access to the king post 11 or its connection to the trailer under surface 13. End wall 27 and cylindrically shaped inside wall 28 define the cylindrically shaped socket 26. The housing 22 has a central longitudinal axis 29 that coincides with the central longitudinal axis of the king post 11.

Figure 7:
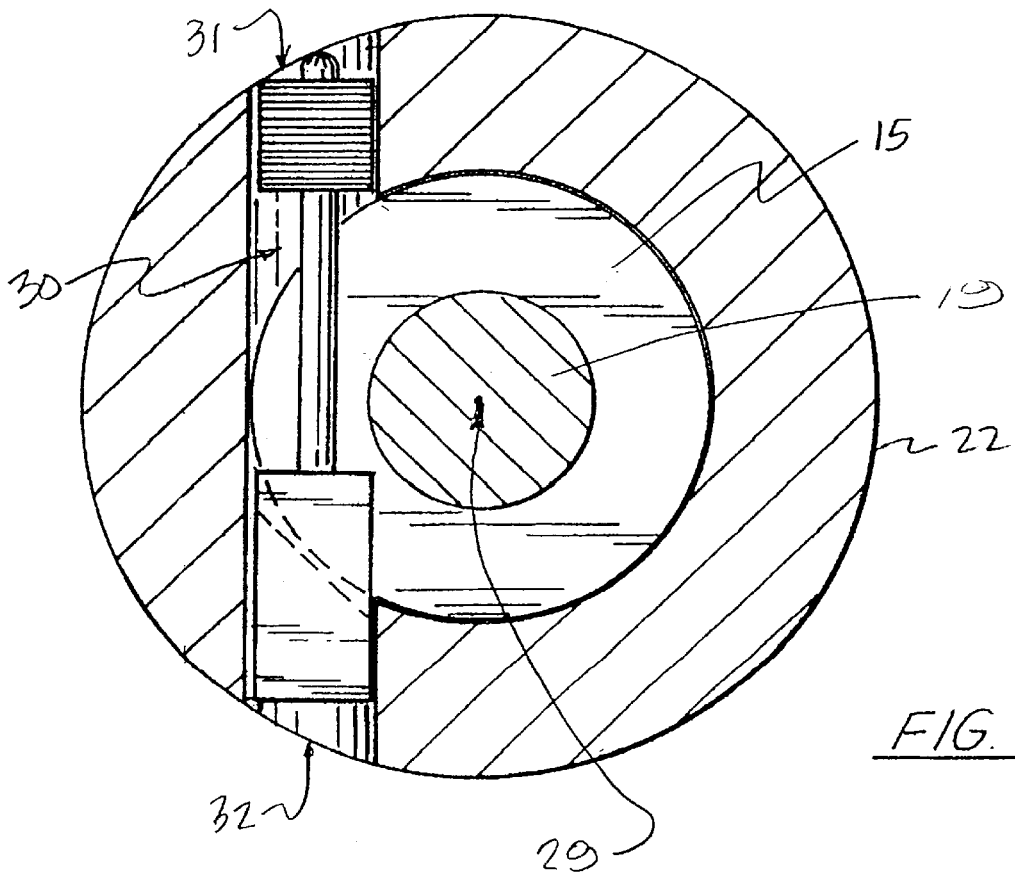
FIG. 7 is a sectional view taken along lines 7—7 of FIG. 4.

A lateral passage way 30 extends through the housing 22 and communicates with the lowermost smaller diameter section 15, and annular recess 18 as shown in FIGS. 1, 4–5 and 7. The lateral passage way 30 has openings 31, 32, at the outer cylindrically shaped side wall 25 of housing 22. Locking member 33 occupies lateral passageway 13 during use as shown in FIGS. 1, 4 and 7.

The locking member 33 includes a c-shaped clasp 34, a pair of shanks 35, 36 that are generally parallel and a lock body 40. The c-shaped clasp 34 has a beveled surface 37 that fits closely against larger diameter cylindrical section 15. The upper shank 35 fits annular recess 18, while the lower shank 36 registers below larger diameter section 15 at bottom surface 16 of king post 11. This places the space 43 in between shanks 35 and 36, in communication with larger diameter cylindrical section 15 of king post 11 as shown in FIGS. 4 and 7. The c-shaped clasp 34 has two flat surfaces 38 and 39 that register against annular shoulder 21 and bottom surface 16 of king pin 11, respectively. Clasp top 34', when clasp 34 is in registry with king pin 15 is substantially received within lateral passageway 30 such that clasp 34' is within the envelope of cylindrical sidewall 25. By being so contained within the confines of lateral passageway 30, clasp 34 presents no aspect exteriorly so as to be cut or otherwise compromised in the locking fashion.

This is accomplished by first placing the locking housing 22 over the king post 11 as shown in FIG. 6. The two shanks 35, 36 are then inserted into the opening 32 end portion of lateral passage way 30. When the shanks and c-shaped clasp 34 are in locking position about larger diameter cylindrical section 15, the lock body 40 can be assembled to the shanks 35, 36 as shown in FIGS. 4 and 7. The lock body 40 provides a pair of openings 41, 42, that engage the shanks 35, 36 in a conventional manner of "padlocks", locking with the recesses 44 that are spaced along the shanks 35, 36. Such a keyed locking body 40 in one form is commercially available from Master® Locks. The lock body 40 may be a keyed lock body or a combination or tumbler type lock body having a plurality of tumblers with numbers thereon, with a selected dialable combination. In its preferred form, the lock body of the tumbler type avoids the need for trailer owners and tractor drivers to coordinate the use of keys and lock bodies, currently a problem. In its preferred form, lock body 40 is specially fabricated such that it is received substantially within lateral passageway 30 when installed, similar to c-shaped clasp 34. Lock body 40 will be closely received against cylindrical section 15 of king post 11, being also sized to be received in close register with the sidewalls of lateral passageway 30 and within the envelope of cylindrical sidewall 25 whereby no aspect of lock body is presented for cutting or other compromise. In a still further preferred form, lock body 40 will contain beveled surfaces and flat surfaces forming a space (all no shown) similar to 37, 38 and 43 of clasp 34. Bu such adaptation, the lower large diameter cylindrical section 15 of king post 11 may be more securely received within locking member 10, providing additional security, currently unknown, against removal by prying or any other longitudinal force.

As shown in FIG. 7, locking member 33 can be protectively contained entirely within lateral passageway 30 during use providing a level of security heretofore unknown. Likewise, the fabrication of locking housing 22, clasp 34 and lock body 40 of materials particularly to the cut of powered saws or conventional cutting torches, further adds to the security afforded by the inventive apparatus.

The following table lists the parts numbers and parts descriptions as used herein and in the drawings attached hereto.

| PARTS LIST | |
|---|---|
| Part Number | Description |
| 10 | king post locking apparatus |
| 11 | king post |
| 12 | trailer |
| 13 | trailer under surface |
| 14 | larger diameter cylindrical section |
| 15 | larger diameter cylindrical section |
| 16 | bottom surface |
| 17 | top surface |
| 18 | annular recess |
| 19 | smaller diameter cylindrical section |
| 20 | annular shoulder |
| 21 | annular shoulder |
| 22 | locking housing |
| 23 | upper surface |
| 24 | lower surface |
| 25 | cylindrical sidewall |
| 26 | cylindrically shaped socket |
| 27 | end wall |
| 28 | inside wall |
| 29 | central longitudinal axis |
| 30 | lateral passageway |
| 31 | opening |
| 32 | opening |
| 33 | locking member |
| 34 | c-shaped clasp |
| 34' | clasp top |
| 35 | shank |
| 36 | shank |
| 37 | beveled surface |
| 38 | flat surface |
| 39 | flat surface |

-continued

PARTS LIST

| Part Number | Description |
|---|---|
| 40 | keyed lock body |
| 41 | opening |
| 42 | opening |
| 43 | space |

The foregoing embodiments are presented by way of example only; the scope of the present invention is to be limited only by the following claims.

I claim:

1. A locking apparatus for locking a fifth wheel truck trailer type king pin extending down from the underside surface of the trailer, the king pin having an outer surface that includes a first section of a first larger diameter, a second section of a larger diameter and an annular recess extending circumferentially about the king pin between said first and second sections wherein said locking apparatus comprises:

a) a locking housing that envelops the king pin with a housing envelope during use, said housing having a top surface, a bottom surface, and a sidewall that define said envelope, and a central, generally vertical socket that receives the king pin during use, said socket closely conforming to the outer surface of the king pin;

b) a lateral passageway that extends through said housing and contained entirely within said housing envelope, said lateral passageway being open ended to communicate with said housing sidewall at spaced apart sidewall openings;

c) wherein said lateral passageway communicates with the annular recess when said housing is assembled upon the king pin; and d) a removable locking member that occupies the lateral passageway and is contained within said envelope when said locking member is in the locking position, the locking member having first and second enlarged end portions that are positioned respectively at the spaced apart sidewall openings, and that substantially fill said passageway at both ends of the passageway, and when said locking member is in the locking position, said locking member including a central portion that removably connects the enlarged end portions and occupies a portion of the annular recess of the king pin.

2. The king pin locking apparatus of claim 1 wherein said housing top surface closely abuts the underside surface of the trailer.

3. The king pin locking apparatus of claim 1 wherein said lateral passageway is an elongated linear passageway.

4. The king pin locking apparatus of claim 1 wherein said locking member includes a shank that occupies the annular recess of the king pin when said locking member is in the locking position.

5. The king pin locking apparatus of claim 1 wherein said lateral passageway has a transverse cross section that is generally rectangular.

6. The king pin locking apparatus of claim 1 wherein said vertical socket is shaped to closely conform to and receive the king pin.

7. The king pin locking apparatus of claim 1 wherein said socket is open at one end and closed at the other end.

8. The king pin locking apparatus of claim 1 wherein said locking member includes two enlarged end portions that substantially fill said lateral passageway at the housing sidewall and an elongated shank fixedly secured in the first of said enlarged end portion that is received in the annular recess of the king pin when said locking member is in the locking position.

9. The king pin locking apparatus of claim 8 wherein the second of said enlarged end portions include locking apparatus to selectively engage said elongated shank when said locking apparatus is in the locking position.

10. The king pin locking apparatus of claim 8 wherein said second enlarged end portion includes a tumbler operated locking mechanism to selectively engage said elongated shank.

11. A locking apparatus for locking a fifth wheel truck trailer type king pin extending down from the underside surface of the trailer, the king pin having an outer surface that includes a first section of a first larger diameter, a second section of a larger diameter and an annular recess extending circumferentially about the king pin between said first and second sections wherein said locking apparatus comprises:

a) a locking housing that envelops the king pin during use, said housing have a top surface, a bottom surface, a sidewall and a central, generally vertical socket that receives the king pin during use, said socket closely conforming to the outer surface of the king pin;

b) a lateral passageway that extends through said housing, said lateral passageway being open ended to communicate with said housing sidewall at spaced apart openings in said sidewall;

c) wherein said lateral passageway communicates with the annular recess when said housing is assembled upon the king pin, wherein said locking member includes two enlarged end portions that substantially fill said lateral passageway at the housing sidewall and an elongated shank fixedly secured in the first of said enlarged end portions that is received in the annular recess of the king pin when said locking member is in the locking position; and d) a removable locking member that occupies the lateral passageway when said locking member is in the locking position, the locking member having first and second end portions that are positioned respectively at the spaced apart sidewall openings that substantially fill said passageway at said housing sidewall when said locking member is in the locking position and a central portion that occupies a portion of the annular recess of the king pin wherein said first enlarged end member includes a channel parallel to said elongated shank, and said channel is adapted in cross section to closely receive the king pin below the annular recess when said locking member is in the locking position.

12. The king pin locking apparatus of claim 11 wherein said second enlarged end member includes a channel parallel to said elongated shank and said channel is adapted in cross section to closely receive the end portion of the king pin below the annular recess when said locking member is in the locking position.

13. A locking apparatus for locking a fifth wheel king pin extending down from the underside surface of the trailer, the king pin having an outer surface that includes a first section of a first larger diameter, a second section of a larger diameter, and an annular recess extending circumferentially about the king pin between the first and second sections comprising:

a) a locking housing that envelops said king pin during use, said housing having a top surface, a bottom surface, a sidewall and a central, generally vertical socket that receives said king pin during use, said socket closely conforming to the outer surface of the king pin;

b) a lateral passageway that extends through said housing, said lateral passageway being open ended to communicate with said housing sidewall at spaced apart openings in said sidewall;

c) wherein said lateral passageway is contained entirely within one half of the housing defined by a vertical plane passing through the central longitudinal axis of said king pin; and d) a removable locking member that occupies said lateral passageway, said locking member having end portions that substantially fill said passageway at said housing sidewall, said locking member engaging said king pin below said annular recess to prevent removal of said housing from said king pin.

14. The king pin locking apparatus of claim 8 wherein said locking member includes two elongated shanks fixedly secured in the first of said enlarged end portions whereby one of said shanks is received in the annular recess of the king pin and the second of said shanks being disposed below said king pin when said locking member is in the locking position.

15. The king pin locking apparatus of claim 13 wherein said removable locking member has end portions that conform to the shape of said longitudinal passageway and are closely received substantially therein when said locking member is in the locking position.

16. The king pin locking apparatus of claim 13 wherein the top of said housing fits flush against said trailer under surface when said housing is attached to said king post in locking position.

17. The king pin locking apparatus of claim 13 wherein said housing socket has a closed end portion that closely conforms to the bottom of the king post below said locking member when in the locking position.

18. The king pin locking apparatus of claim 13 wherein said locking member includes two enlarged end portions that substantially fill said lateral passageway at the housing sidewall and an elongated shank fixedly secured in the first of said enlarged end portions that is received in the annular recess of the king pin when said locking member is in the locking position.

19. The king pin locking apparatus of claim 13 wherein the second of said enlarged end portions include locking apparatus to selectively engage said elongated shank when said locking apparatus is in the locking position.

20. The king pin locking apparatus of claim 13 wherein said second enlarged end portion includes a tumbler operated locking mechanism to selectively engage said elongated shank.

* * * * *